(12) United States Patent
Krapf et al.

(10) Patent No.: US 8,111,169 B2
(45) Date of Patent: Feb. 7, 2012

(54) LOCATING DEVICE

(75) Inventors: Reiner Krapf, Reutlingen (DE);
Michael Mahler, Leinfelden-Echterdingen (DE);
Christoph Wieland, Stuttgart-Vaihingen (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 12/303,220

(22) PCT Filed: Apr. 2, 2007

(86) PCT No.: PCT/EP2007/053162
§ 371 (c)(1),
(2), (4) Date: Apr. 15, 2009

(87) PCT Pub. No.: WO2007/141061
PCT Pub. Date: Dec. 13, 2007

(65) Prior Publication Data
US 2010/0026508 A1 Feb. 4, 2010

(30) Foreign Application Priority Data
Jun. 2, 2006 (DE) .......... 10 2006 025 881

(51) Int. Cl.
*G08B 21/00* (2006.01)

(52) U.S. Cl. .......... 340/686.6; 340/686.1; 324/67; 33/773

(58) Field of Classification Search .......... 340/686.1, 340/686.6, 685, 551; 73/803; 324/218, 243, 324/239, 67, 237, 244; 33/773, 775
See application file for complete search history.

(56) References Cited

U.S. PATENT DOCUMENTS

| 6,119,526 | A | 9/2000 | Reigstad et al. | |
|---|---|---|---|---|
| 6,886,269 | B2 * | 5/2005 | Hoffmann et al. | 33/773 |
| 7,408,461 | B2 * | 8/2008 | Fluck | 340/551 |
| 7,414,235 | B2 * | 8/2008 | Hoffmann et al. | 250/221 |
| 7,468,675 | B2 * | 12/2008 | Morath | 340/685 |
| 7,574,732 | B2 * | 8/2009 | Knox et al. | 726/3 |
| 2003/0012411 | A1 | 1/2003 | Sjostrom et al. | |

* cited by examiner

*Primary Examiner* — Anh V La
(74) *Attorney, Agent, or Firm* — Merchant & Gould P.C.

(57) ABSTRACT

The invention is based on a locating device for locating objects in an item being investigated, the device having a basic body, a guide unit for guiding along the item being investigated in at least one direction of movement and an output unit. It is proposed that the locating device has a control unit which, in conjunction with the output unit, is provided for the purpose of outputting at least one item of information relating to a distance in the direction of movement with at least one dimensional distance variable.

9 Claims, 4 Drawing Sheets

LOCATING DEVICE

TECHNICAL FIELD

The invention is based on a locating device according to the preamble of claim 1.

BACKGROUND

A locating device is known, which indicates during operation the presence and the position of objects in building materials to the operator. Such objects include, for example, pipes, cables and reinforcements in walls, ceilings or floors. Furthermore, the locating device has rolling bodies. In order to scan an item being investigated, said locating device can be moved by means of said rolling bodies along a surface of the item being investigated.

SUMMARY

The invention is based on a locating device for locating objects in an item being investigated, said device having a basic body, a guide means for guiding along the item being investigated in at least one direction of movement and an output unit.

It is proposed that the locating device has a control unit, which, in conjunction with the output unit, is provided for the purpose of outputting at least one item of information relating to a distance in the direction of movement with at least one dimensional distance variable. In so doing, the ease of use can be increased during an operation of the locating device, in that said item of information can be outputted in a form, which is intuitive to the operator. The guide means is preferably configured as a rolling body, which is mounted on the basic body and allows for a rolling of the basic body in the direction of movement. The guide means can alternatively or additionally be configured as a sliding surface on the basic body, which allows it to slide on the item being investigated in the direction of movement. By a dimensional distance variable, a variable, to which a unit of measurement is assigned, should especially be understood. The unit of measurement preferably belongs to a standard measuring system, as, for example the metric system or the Anglo-American standard measuring system. If the distance variable is indicated to the operator, the unit of measurement can jointly be indicated. If the association between the unit of measurement and the distance variable is unambiguous to the operator, an indication of the unit of measurement can be omitted.

It is furthermore proposed that the output unit has a display unit to indicate the item of information relating to said distance in the direction of movement to the operator, and provision is made for the control unit in conjunction with the display unit to indicate the distance variable in the form of an electronically produced numeral. In so doing, an especially fast and precise acquirement of the item of information relating to said distance in the direction of movement can be achieved. This numeral can be indicated by means of a digital display, such as a LED Display (Light Emitting Diode) or a LC Display (Liquid Crystal Display).

The distance preferably depends at least on a length of path of a distance covered by the basic body in the direction of movement, whereby a particularly intuitive acquirement of the item of information relating to said distance can be achieved. The distance covered can be a length of path covered by the basic body in the direction of movement. The distance covered can alternatively be a length of path to be covered by the basic body, which, for example, can be defined by an operator. The distance can additionally be configured as the distance between two detected objects or between two reference points defined by the operator, such as, for example, borehole locations.

It is proposed in a preferred embodiment of the invention that the locating device have a sensor unit for acquiring at least one movement parameter during a movement of the basic body; and in so doing, provision is made for the control unit in conjunction with the output unit to at least essentially synchronously update the distance variable, which has been outputted, for a progression of the movement parameter. A particularly high ease of use can be achieved. By a "movement parameter", a parameter should particularly be understood, by which a characteristic of the movement of the basic body relative to the item being investigated, such as especially a length of path or a direction of movement, can be ascertained. Different methods can be employed at the sensor unit for acquiring the movement parameter. Said parameter can, for example, be opto-mechanically acquired, as, for example, with the aid of the principle of a light barrier. Furthermore, an optical method can be employed, whereby a surface structure of the item being investigated is analyzed to acquire a direction of movement and/or a distance covered during the movement of the basic body, as, for example, by means of a CCD sensor (Charge-Coupled Device). In so doing, the surface can be illuminated, and a laser beam can be used for a precise analysis of the surface. The use of an electronic method for acquiring the movement parameter, as, for example, with the aid of a radar signal, is likewise conceivable. If the locating device for locating objects is configured by means of a radar method, a radar unit employed for locating objects can additionally be used to acquire the movement parameter.

It is furthermore proposed that the locating device have a locating unit for acquiring an item of information relating to a location of the item being investigated, which is different from the distance variable, and a logging mode for acquiring a data bank, in which the item of information relating to a location is assigned to the item of information relating to a distance in the direction of movement. In so doing, an especially high degree of flexibility in the use of the locating device can be achieved, in that, for example, an opinion is furnished about an item being investigated, which after a measurement procedure can be used for other purposes. In this connection, it is proposed that the locating device has a memory unit for storing at least the data bank, whereby the data bank can be especially quickly and simply compiled and the data in said data bank can be quickly accessed.

It is proposed in this context that the locating device has a memory unit for storing at least the data bank, whereby a particularly quick and simple compilation of the data bank and a quick access to the data in the data bank can be achieved.

The output unit advantageously has an interface for outputting at least the distance variable to a data unit, which is external to the basic body, whereby a high degree of flexibility can be achieved in the evaluation of the item of information relating to a distance in the direction of movement. Provision is preferably made for the interface to be for wireless transmission, i.e., for example, an infrared or Bluetooth interface.

It is furthermore proposed, that the locating device has an input device and an input mode, wherein a reference point for ascertaining the distance variable can be defined using the input device. An operator can thereby advantageously dispense with the use of additional aids, as, for example a meter stick and/or a marking instrument for marking the reference point. This reference point can serve as the point of origin for ascertaining the distance variable or as the marker for an operating position, as, for example, a borehole location.

The locating device advantageously has an input device and an input mode for inputting the distance, which establishes the distance to be covered by the basic body. In so doing, a desired position of the basic body can be especially simply and precisely achieved. The distance to be covered can be the distance, which was inputted. The distance to be covered and the distance can differ by a length, which is a function of a dimension, especially the width of the basic body in the direction of movement. The distance to be covered can thereby be automatically defined using the distance, which was inputted.

An especially simple and intuitive operation of the locating device can be achieved if the locating device has a locating unit for acquiring an item of information relating to a location of the item being investigated. In so doing, the control unit is provided for the purpose of at least partially automatically defining a reference point for ascertaining the distance variable using the item of information relating to a location. A point of origin for ascertaining the distance variable can thereby be automatically assigned to a detected object.

BRIEF DESCRIPTION OF THE DRAWINGS

Additional advantages become apparent in the following description of the drawing. Examples of embodiment of the invention are depicted in the drawing. The drawing, the description and the claims contain numerous characteristics in combination. The expert will also advantageously consider the characteristics on an individual basis and integrate them into additional meaningful combinations.

The following are shown.

DETAILED DESCRIPTION

Figure 1:
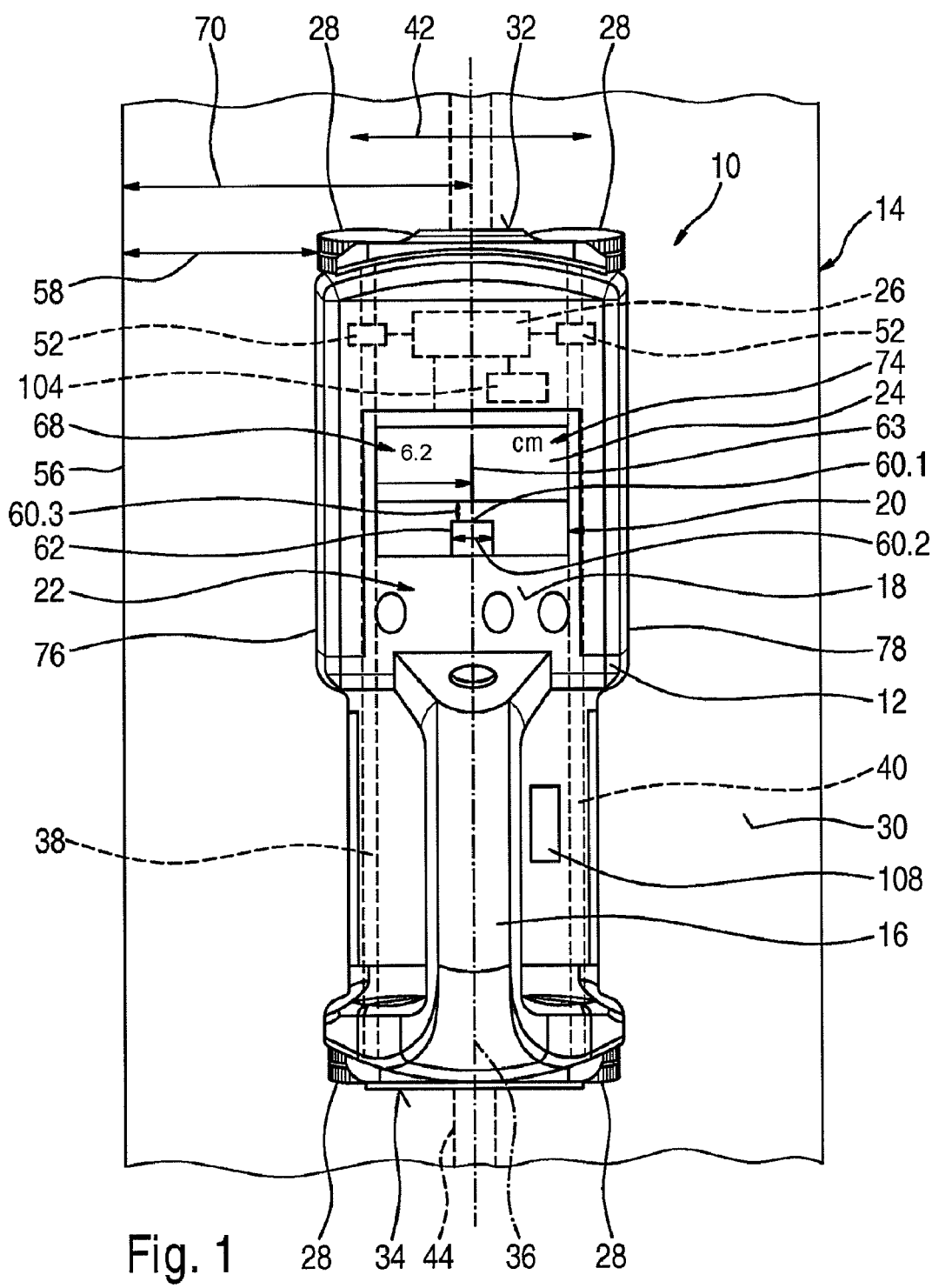
FIG. 1 is a locating device which is operated along a wall.

FIG. 1 shows a locating device 10 with a basic body 12 configured as a housing. It is positioned on an item being investigated 14, which is configured as a wall. A handle 16, by which the locating device 10 can be held by an operator, is mounted on the basic body 12. An output unit 20 for outputting an item of information to an operator and an input device 22 for inputting an item of information by an operator are attached to the operator side 18 of the basic body 12. Said output unit 20 and said input device 22 have a set of operating buttons. The output unit 20 has a display unit 24, which is configured as a LC Display (Liquid Crystal Display). The output unit 20 is controlled during operation by a control unit 26. Furthermore, there are four guide means 28, which are configured as wheels, mounted on the basic body 12, which in the position shown rest against a surface 30 of the item being investigated 14. There are in each case two of the guide means 28 disposed in the region of a lateral surface 32, respectively 34, of the basic body 12. Said lateral surface 32, respectively 34, is vertically oriented to the direction of main extension of the basic body 12, which is denoted by a central axis 36. The guide means 28 are connected in pairs by an axis 38, respectively 40. The axes 38, 40 extend on both sides of the central axis 36 in the direction of main extension of the basic body 12. The guide means 28 serve the purpose of guiding the basic body 12 in a direction of movement 42, which is parallel to the surface 30 of the item being investigated 14. The direction of movement 42 is vertically oriented to the direction of main extension of the basic body 12.

Figure 2:
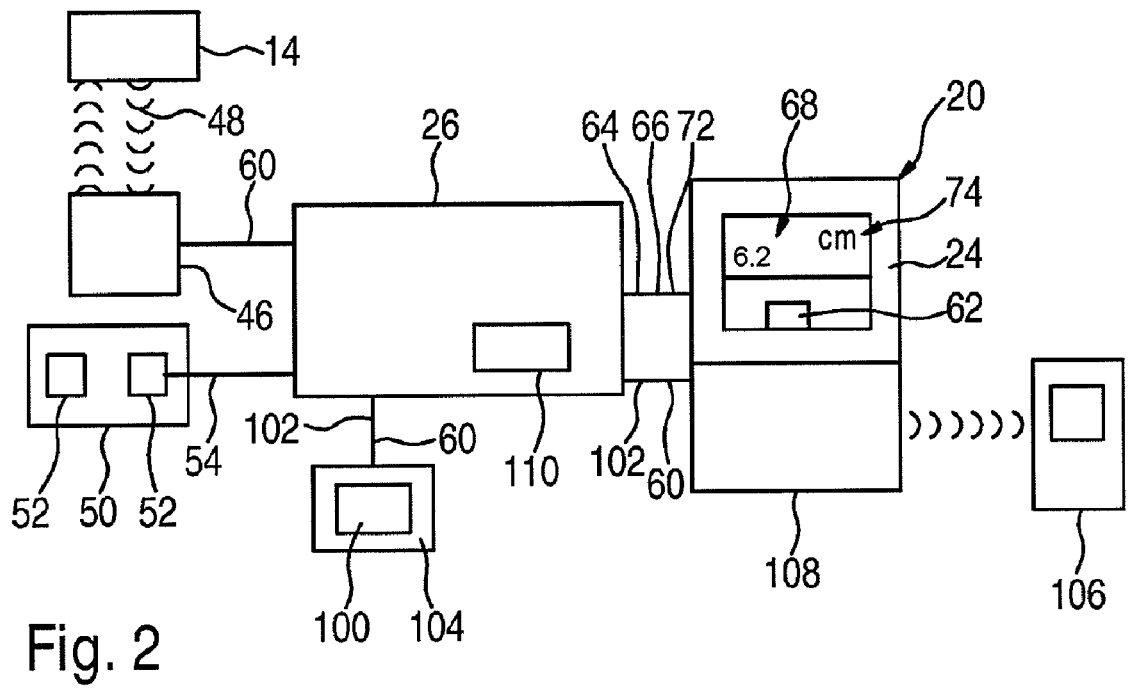
FIG. 2 is internal components of the locating device.

The item being investigated 14 can be scanned by a movement of the basic body 12, which is actuated by the operator, to locate objects, which are invisibly disposed beneath the surface 30, such as, for example object 44. For this purpose, the locating device 10 has a locating unit 46, which is disposed beneath the display unit 24 and is depicted in FIG. 2. An interaction of the control unit 26 with the locating unit 46 and the output unit 20 is depicted in detail with the aid of FIG. 2. The locating unit 46 comprises a transmitting unit for the transmission of a measuring signal 48—which, for example, is configured as a radar signal, UWB signal (Ultra-wideband signal) or an inductive or capacitive measuring field—a receiving unit for receiving the measuring signal 48 after its interaction with the item being investigated 14 and an evaluation unit for evaluating the measuring signal 48 (not shown in the Figures).

The locating device 10 can additionally output an item of information about a movement of the basic body 22 relative to the item being investigated 14, which is actuated by the operator. For this purpose, the locating device 10 has a sensor unit 50, which comprises two sensor means configured as path sensors. The sensor means 52 are in each case coupled to one of the axes 38, 40 (see FIG. 1). The sensor means 52 respectively have a segmented wheel, which is attached to a partial region of the axes 38, 40, at least one transmitting unit for the production of a light beam and a receiving unit to receive the light beam (not shown in the figure). On the basis of the principle of a light barrier, the sensor means 52 respectively acquire a movement parameter 54, which corresponds to an increment of the path with one rotation of the segmented wheel actuated by the movement of the basic body 12. This principle is known and is not explained in detail within the scope of this description.

With the aid of these movement parameters 54, which are provided to the control unit 26 in the form of an electric signal, an item of information about a movement of the basic body 12 can be obtained. A length of path covered by the basic body 12 and/or a direction of movement can especially be ascertained by the control unit 26. In so doing, an increased accuracy in the ascertainment of a length of path can be achieved by the acquisition of two movement parameters, which are acquired at two axes 38, 40 independent of each other. Errors can, for example, be corrected, which, for example, arise due to nonlinearities, which can be attributed to a structure of the surface 30.

It is assumed that an operator implements a scanning of the item being investigated 14. In so doing, said operator places the locating device 10 on an edge 56 of the item being investigated 14, which, for example, corresponds to a corner of a wall, and moves it in the direction of movement 42 for a distance 58 configured as the length of path. In the position of the locating device 10, which is shown in FIG. 1, the object 44 in the item being investigated 14 has been detected by the locating unit 46. In so doing, the locating unit 46 outputs items of information relating to a location 60 after evaluation of the measuring signal 48, namely above all else the position 60.1 of the center of the object 44 relative to the basic body 12, the width 60.2 of the object 44 and the depth 60.3 of the object 44 in the item being investigated 14. The aforementioned items of information relating to a location 60 are indicated by a display unit 24 with an object symbol 62. Using the items of information relating to a location, the control unit 26 produces a control signal 64 for controlling the operation of the output unit 20, whereby the object symbol 62 is displayed. Moreover, an additional symbol is displayed in this example, which corresponds to the central axis 36 of the basic body 12. By means of this additional symbol, the operator can quite easily detect the position of the object 44 relative to the central axis 36. In the example depicted, the center of the object is located on the central axis 36. As an alternative to displaying the symbol 63, a mark on the basic body 12 can also be displayed on the border of the display unit 24.

When moving the locating device 10 into the indicated position of FIG. 1, the movement parameters 54, which correspond to an increment of the path of the guide means 28, are acquired by the sensor unit 50 during the movement. The movement parameters 54 are provided to the control unit 26. With these movement parameters 54, the control unit 26 produces a control signal 66, whereby the indication of the detected object 44 on the display unit 24 is adapted to the actual position of the object 44 relative to the basic body 12. The object symbol 62 thereby moves, according to the acquired increment of the path, within the display unit 24, which is configured as an LC-Display. For this reason, a certain correlation factor is selected while a certain path, for example 1 cm, corresponds to a certain number of pixels of the display unit 24. A true-to-scale image of the item being investigated 14 and if need be of detected objects can be displayed. A region of the item being investigated 14 can, for example, be displayed, which extends beyond the width of the basic body 12. In particular a true-to-scale image of the entire item being investigated 14 can be displayed on the display unit 24. Moreover, symbols can also be displayed, whose width on the display unit 24 corresponds to the real width of the corresponding object, which was detected. A true-to-scale image of the region of the item being investigated 14, which is covered by at least a partial region of the basic body 12, can thereby be displayed. The correlation factor, which assigns a number of pixels to a path, can be set during manufacturing or preferably during an operation by an operator.

The control unit 26 furthermore ascertains the distance 58 of the path covered by the basic body 12 and in fact in a unit of measurement defined by the operator or in the factory. In this example, the unit of measurement is the metric centimeter. In the example being considered, the locating device 10 is operated in an operational mode, wherein distances relative to the central axis 36 of the basic body 12 are ascertained. In so doing, the control unit 26 adds the half width of the basic body 12 and the distance 58, which was ascertained, so that a distance variable is ascertained, which corresponds to a distance 70 between the point of origin of the path covered, in this case the edge 56, and the central axis 36. This distance variable 68 and an electric control signal 72 are provided to the output unit 20. This control signal 72 controls the indication of the distance variable 68 by means of a numerical symbol and a unit of measurement signal 74. In additional modes, the distance variable 68 can alternatively be ascertained with reference to the edges 76, 78 of the basic body 12. If, for example, reference is made to the edge 76, the distance variable 68, which is displayed, thus corresponds to the distance covered 58. The unit of measurement being used, for example millimeters, centimeters, meters etc., can be defined by the operator by means of the input device 22 and an operator interface indicated by the display unit 24. The display of the unit of measurement can take place through the unit of measurement symbol 74 and/or a scale divided in the form of segments by the unit of measurement can be displayed. In the latter case, the distance variable 68 is found by comparing the object symbol 62 with the scale. Provision is also made for a mode option, by which an indication of the unit of measurement is hidden; and in so doing, space is made available for the display of additional items of information, particularly items of information relating to a location. The distance variable 68 can also be displayed only at the request of the operator, for example by actuating the input device 22. In an automatic mode the distance variable 68 is continuously displayed, so that the operator is continually informed during the movement of the basic body 12 over the distance covered 58. In order to do this, the updating of the outputted distance variable 68 is continually correlated with a time history of the movement parameters 54 via the control unit 26. Provision is made in a further mode option for the displaying of the distance variable 68 to be correlated with the beginning of an operation with the locating device 10.

The operator can furthermore be informed about the distance of the detected object 44 relative to the edge 56 or to an additional reference point defined by him. This can take place especially easily by means of the ongoing display of the distance variable 68 and the symbol 63. In the example depicted in FIG. 1, the distance variable 68 being displayed corresponds to the distance of the center of the object 44 to the edge 56, and namely to the distance 70, because the center of the object 44 is disposed on the central axis 36. The distance between the left, respectively right, edge of the object 44 and the edge 56 of the item being investigated 14 can additionally be simply discerned while the basic body 12 starting from the position shown is moved to the left, respectively to the right. At the same time, the object symbol 62 corresponding to the object 44 is correspondingly displaced within the display unit 24. The basic body 12 is moved until the symbol 63 correlates with the left, respectively right, edge of the object symbol 62. The distance variable 68 then corresponds to the desired distance. Alternatively or in addition to the ongoing distance variable 68, a distance of the object 44 to the edge 56 can be displayed at any time by request of the operator. Said distance is ascertained from the left or right edge of the object 44 or from said object's center.

Figure 3:
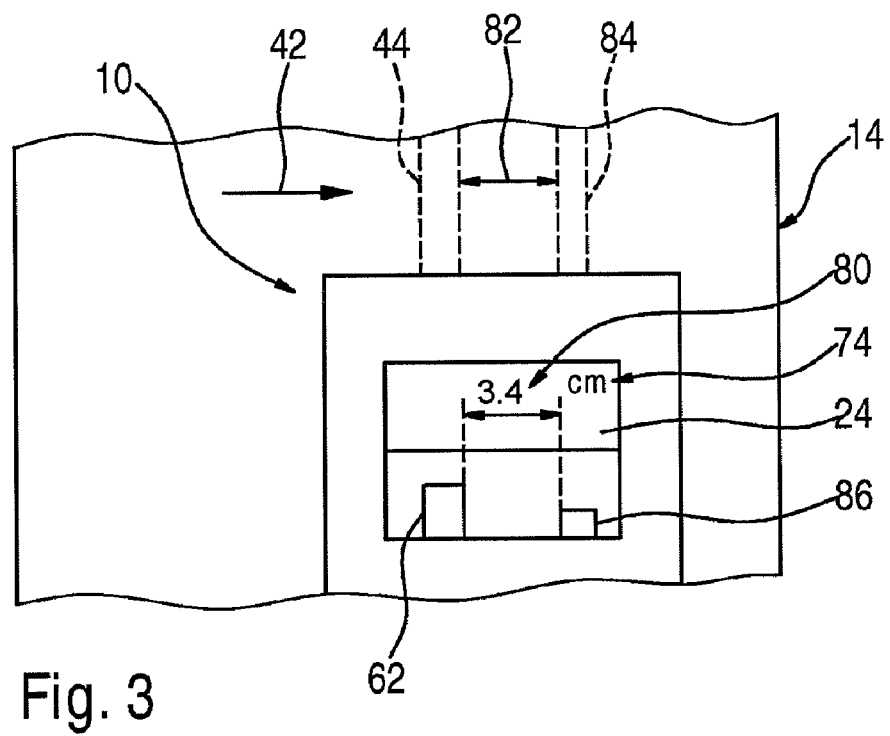
FIG. 3 shows the displaying of a distance between two detected objects.

Provision is made in an additional operating mode for a distance variable 80 to be displayed, which corresponds to a distance 82 between two detected objects. This is depicted in FIG. 3. It is assumed on the basis of the position of the locating device 10 depicted in FIG. 1 that the operator of the locating device 10 further proceeds in the direction of movement 42. An additional object 84 is detected, which is signaled by the displaying of an additional object symbol 86. Simultaneously with the display of the object symbol 86, the distance 82 between the objects 44, 84 is displayed in the form of the distance variable 80 in a unit of measurement. This takes place thereby, in that the control unit 26 defines a reference point for ascertaining the distance 82 when detecting the first object 44 with the aid of the corresponding items of information relating to a location 60, which correspond to the detection of the first object 44. When the basic body 12 is being moved, the length of path covered by the basic body 12 is then continuously ascertained by the control unit 26 with the aid of the movement parameters 54 until the second object 84 is detected. When the second object 84 is detected, the length of path is no longer ascertained. With this length of path and on the basis of items of information relating to a location 60, particularly the respective width of the detected objects 44, 84, the distance 82 can be ascertained. This distance 82 between the objects 44, 84 is in this example the distance between the respective edges of the objects, which are facing each other. The distance between the centers of the objects can alternatively be ascertained. After the distance 82 has been ascertained, a control signal for the display of the distance 82 in the form of the distance variable 80 and the corresponding unit of measurement is produced by the control unit 26.

Figure 4:
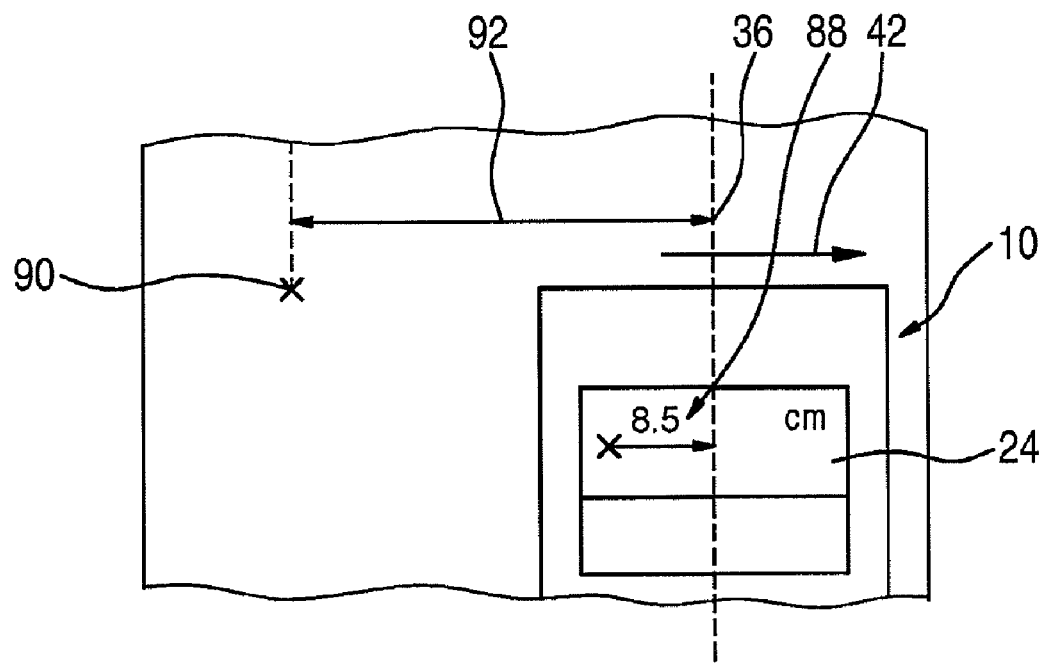
FIG. 4 shows the defining of a reference point for measuring a distance.

A reference point for ascertaining an additional distance variable 88 can be defined in an additional operating mode independent of the detection of an object by the operator. This is depicted in FIG. 4. If the basic body 12, especially the central axis 36 or one of the edges 76, 78, is placed in a position, which, for example, corresponds to a borehole location, the operator can define a reference point 90 by actuating the input device 22 (in the Figure schematically depicted by a cross). When moving the basic body 12 in the direction of movement 42, the distance variable 88, which corresponds to the distance 92 between the reference point 90 and the central axis 36, is ascertained with reference to this reference point 90 and is continuously displayed. Especially the use of an additional measuring device, for example a meter stick, can be eliminated by this mode. This defining of the reference point 90 can be implemented without having to interrupt a measuring procedure of the locating unit.

Figure 5:
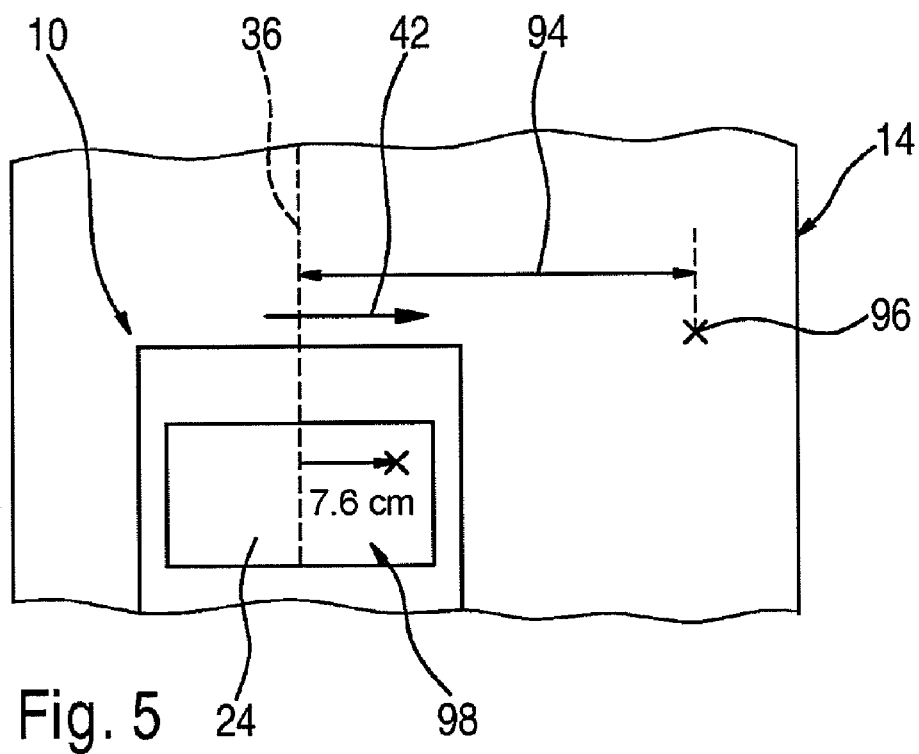
FIG. 5 shows the defining of a length of path to be covered by the locating device.

An additional operating mode is explained using FIG. 5. In this mode, a defined distance 94 can be inputted by the operator using the input device 22 and an operator interface displayed with the display unit 24. Said distance 94 is configured as a length of path to be covered in the direction of movement 42 to achieve a desired working position 96, for example a borehole location. The control unit 26 then defines the current position of the basic body 12 shown in FIG. 5, particularly the central axis 36 of said basic body 12, as a reference point. When moving the basic body 12, the length of path covered is acquired with the aid of the movement parameters 54 and is compared with the distance 94 to be covered, so that the length of path still to be covered can be ascertained in the form of a distance variable 98, which is then displayed. When the desired working position 96 has been achieved, i.e. when the working position 96 lies on the central axis 36, an optical signal, for example via a light emission or via the display of the display unit 24, and/or an audible signal can be outputted. When the basic body 12 is moving, the length of path to still be covered can be displayed. In the example being considered, the desired end position can alternatively lie in the fact that the working position 96 is in contact with the edge 78. At the same time, as described above, the distance 94 between the central axis 36 and the working position is inputted, the distance 94 differing from the length of path to be covered by the basic body 12 by the half width of the basic body 12.

Figure 6:
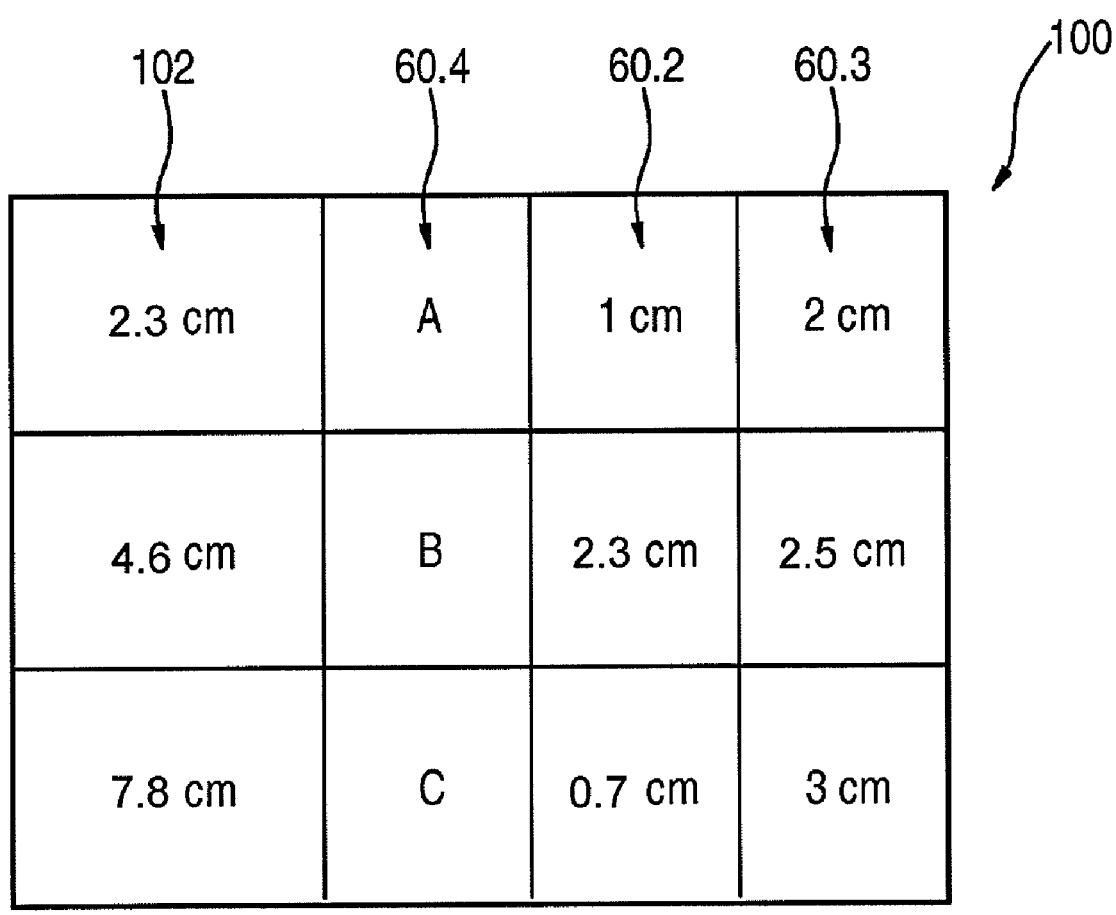
FIG. 6 is a data bank compiled by the locating device.

The locating device 10 is furthermore equipped with a logging mode, which is shown in FIGS. 2 and 6. In this mode, notably a data bank 100 is compiled, wherein an item of information relating to a distance, which is ascertained by the control unit 26 with the aid of the movement parameters 54, is assigned to one of the items of information relating to a location 60. This data bank 100 is depicted in FIG. 6. An item of information relating to a distance is in each case entered in the left column, and in fact most notably a certain position on the surface 30 in the form of a dimensional distance variable 102. This distance variable 102 is preferably ascertained from an edge of the item being investigated 14 in the direction of movement 42. Said distance variable 102 can additionally be ascertained from a reference point defined by the operator. An item of information relating to a location 60 is assigned to the distance variable 102. Said item of information especially consists of a type 60.4 of detected object, which is schematically depicted in the figure by a letter, its depth 60.3 in the item being investigated 14, its width 60.2 etc. The values specified in the figure exemplary serve to illustrate the situation. Furthermore, the item of information: "no object found" can be assigned to the distance variable 102. This data bank represents the topography of the item being investigated 14. With the aid of the data bank 100, a search can be made for a certain position of the item being investigated 14; and in so doing, it can be determined whether an object is present at this position in the item being investigated 14. A search can also be made for a certain object, such as, for example, an electrical connection; and in so doing, it can be determined at which position or positions of the item being investigated 14 such an object is located.

This data bank 100 can be stored during operation in an internal memory unit 104 (FIGS. 1 and 2) of the locating device 10. This data bank 100 is compiled by the control unit 26 during an operation of the basic body 12 with the aid of the movement parameters 54 and the items of information relating to location 60. The data bank 100 can be transmitted to an external data unit 106 after a measuring procedure. In the example being considered, the data unit 106 is configured as a PDA (Personal Digital Assistant). The data unit can alternatively be implemented as a laptop (notebook) or as a carryphone. The output unit 20 is equipped with an interface 108, which is configured as a Bluetooth interface, for establishing a data link with the data unit 106 (see also FIGS. 1 and 2). Bluetooth is a standard specification according to IEEE 802.15.1 for a wireless (radio) cross linking of devices across a short distance. The interface can alternatively be configured as an infrared interface. In addition it is conceivable that provision is made for the interface, such as, for example, a USB interface, to establish a cable connection for transmitting data. After a measuring procedure, the data can be transmitted to the data bank 100 at the option of the operator. An additional logging mode is conceivable, wherein the distance variable 102 and the items of information relating to a location are provided to the data unit 106 without buffering the data in the memory unit 104, the data bank 100 being compiled in an internal memory of the data unit 106. The transmission takes place in each case with the aid of the interface 108 in connection with the control unit 26.

The compilation of the data bank 100 can continuously take place during a scanning of the item being investigated 14, an item of information relating to a location 60 being assigned to each position of the surface 30. The entering of items of information into the data bank 100 can alternatively take place when detecting an object.

The locating device 10 furthermore has a calibration mode, wherein the control unit 26 is calibrated, particularly the ascertainment of the dimensional distance variable 68, 80, 88, 98, with the aid of the movement parameters 54. In this mode, the basic body 12 is moved over a certain path known to the operator, which can be inputted by the input device 22. The locating device 10 can alternatively be constructed in such a way that a constant distance variable for a certain path can be ascertained irrespective of the type of surface 30, the pressure applied to the basic body 12 by the operator, the wear on the guide means 28, the speed of movement etc.

The operating modes described here as well as additional programs for configuring the locating device 10 and for the interaction of the control unit 26 with the units connected to it, such as, for example, programs for adapting the movement parameters 54 and the items of information relating to a location 60 and for producing the control signals 64, 66, 72, are stored in a memory unit 110 of the control unit 26.

The invention claimed is:

1. A handheld locating device for locating objects in an item being investigated, comprising:
   a body configured as a housing comprising:
   a guide means for guiding the body of the handheld locating device along the item being investigated in at least one direction of movement;
   an output unit arranged along a side of the body;
   a control unit that, in conjunction with the output unit, is configured to output at least one item of information relating to a distance in the at least one direction of movement with at least one dimensional distance variable; and a sensor unit for acquiring at least one movement parameter during a movement of the body, wherein the control unit, in conjunction with the output unit, at least synchronously updates the at least one dimensional distance variable for a progression of the at least one movement parameter.

2. The locating device of claim 1, wherein the output unit has a display unit for displaying the at least one item of information relating to a distance to an operator, and wherein the display unit, in conjunction with the control unit, is configured to display the at least one dimensional distance variable in a form of an electrically generated numeral.

3. The locating device according to claim 1, wherein the at least one item of information relating to a distance is at least a function of a length of path of a path of the body in the at least one direction of movement.

4. The locating device of claim 1, further comprising:

a locating unit for acquiring an item of information relating to a location of the item being investigated, wherein said item of information relating to a location is different from the least one item of information relating to a distance; and a logging mode for compiling a data bank, wherein the item of information relating to a location is assigned to the at least one dimensional distance variable.

5. The locating device of claim 4, further comprising a memory unit for storing at least the data bank.

6. The locating device of claim 1, wherein the output unit further comprises an interface for outputting the at least one dimensional distance variable to a data unit positioned external to the body.

7. The locating device of claim 1, further comprising an input device and an input mode, wherein a reference point for ascertaining the at least one dimensional distance variable can be defined by use of the input device.

8. The locating device of claim 1, further comprising an input device and an input mode for inputting the at least one item of information relating to a distance, wherein the at least one item of information relating to a distance defines a path to be covered by the body.

9. The locating device of claim 1, further comprising a locating unit for acquiring an item of information relating to a location of the item being investigated, and wherein the control unit at least partially automatically defines a reference point for ascertaining the at least one dimensional distance variable with the aid of the item of information relating to a location.

* * * * *